April 27, 1926.
A. B. BAILEY
1,582,155
VALVE SPRING COMPRESSOR
Filed Oct. 4, 1923
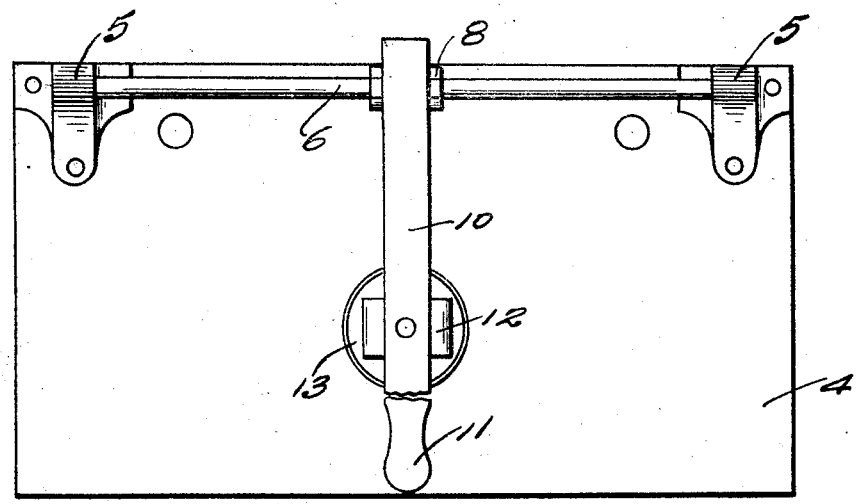
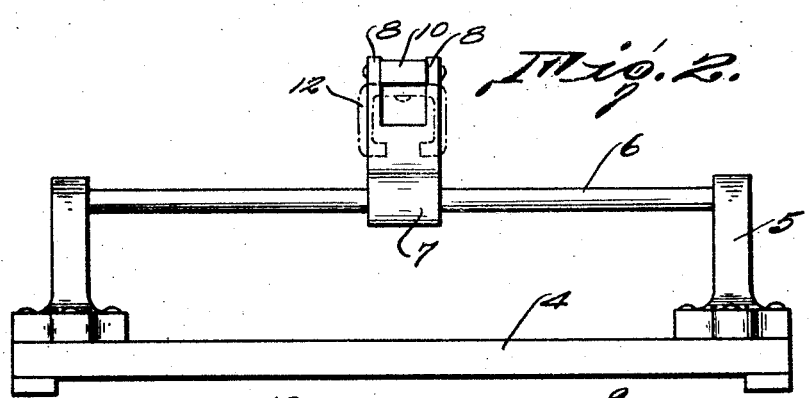
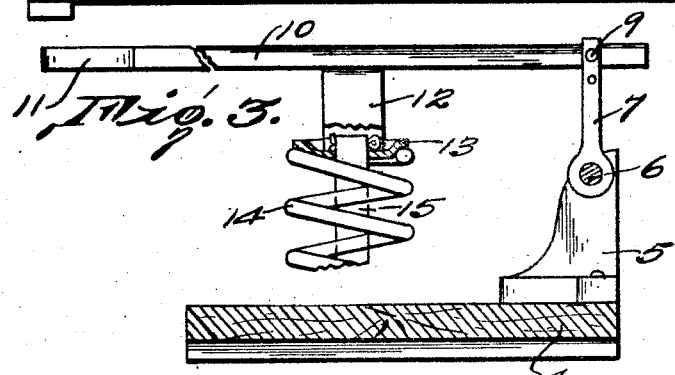
Inventor
Arthur B. Bailey Patented Apr. 27, 1926.

1,582,155

UNITED STATES PATENT OFFICE.

ARTHUR B. BAILEY, OF NORTON, VIRGINIA.

VALVE-SPRING COMPRESSOR.

Application filed October 4, 1923. Serial No. 666,512.

*To all whom it may concern:*

Be it known that I, ARTHUR B. BAILEY, a citizen of the United States, residing at Norton, in the county of Wise and State of Virginia, have invented certain new and useful Improvements in Valve-Spring Compressors, of which the following is a specification.

This invention relates to valve spring compressors and has for an object to provide a simple and durable device which may be conveniently operated for compressing the springs usually employed in connection with the valves of motor vehicle engines so as to permit removal of the pin from the valve stem to permit grinding and refacing of the valves and valve seats.

Another object of the invention is to provide a device especially adapted for use on the springs employed in valve-in-head motors or in the cage valve type so as to permit the springs to be expeditiously removed with facility. Other objects of the invention will be apparent from the following description of the invention taken in connection with the accompanying drawings wherein:—

Fig. 1 is a top plan view of a valve spring compressor constructed in accordance with this invention illustrating its application;

Fig. 2 is an elevational view of the compressor per se; and

Fig. 3 is a transverse sectional view of the compressor illustrating its application.

The device of the present invention consists of a platform 4 which is shown to be of rectangular shape and may be made of wood, metal or other suitable material. Superimposed upon the platform and detachably secured thereto, in proximity to the rear marginal edge of the latter and at the extreme terminals thereof, are a pair of brackets 5. These brackets have aligning recesses therein which receive the opposite ends of a rod 6. The rod is shown to be of circular configuration in cross section and is spaced an appreciable distance from the top of the platform 4.

Slidably and rotatably mounted upon the rod 6 is a link 7 the upper end of which is bifurcated and the branches 8 of the bifurcation provided with openings through which pintles 9 of a lever 10 are rotatably mounted. If desired the hand engaging end of the lever may be formed to provide a handle 11 to permit the same to be conveniently grasped by the operator. The pintles 9 are preferably remote from the rear terminal of the lever 10 to increase the leverage and augment the durability of the compressor. Upon reference to Fig. 3 of the drawings it will be noted that each branch 8 of the bifurcation has a pair of openings therein so that the lever 10 may be adjusted to adapt the same for use with valve springs of different lengths.

A valve spring engaging member 12 is mounted on the lower face of the lever 10, intermediate the ends of the latter, and in the present instance consists of a metal strap the free ends of which are bent downwardly from the lever and turned inwardly at right angles. Upon reference to Fig. 2 of the drawings it will be noted that the ends of the strap are spaced so as to permit the valve stem to pass therebetween when the spring is compressed.

In use of this device the engine head may be mounted upon the platform 4 in a manner which will position one of the valve springs beneath the member 12 so that when the lever 10 is urged downwardly said member 12 will impinge the cap 13 of the spring 14 permitting the spring to be compressed and allowing the valve stem 15 to move upwardly between the ends of said member 12. When the spring is compressed sufficiently the pin 16 may be removed from the valve stem in an apparent manner. By slidably mounting the link 7 on the rod 6 it is apparent that the lever 10 may be moved along for use on the remaining springs in succession.

Various changes may be made in this device especially in the details of construction, proportion and arrangement of parts within the scope of the claim hereto appended.

What is claimed is:—

A valve spring compressor comprising a platform, a rod supported thereon, a link slidably mounted upon the rod, a lever pivoted at a point between its ends to the link, a U-shaped member secured at its intermediate portion to the side of the lever at a point between the ends thereof and disposed transversely thereof, said U-shaped member having inwardly disposed end extremities spaced from each other.

In testimony whereof, I have affixed my signature.

ARTHUR B. BAILEY.